United States Patent
Takayama

(10) Patent No.: US 7,334,495 B2
(45) Date of Patent: Feb. 26, 2008

(54) RESIN GEAR AND ROTATIONAL POWER TRANSMISSION MEMBER OF RESIN

(75) Inventor: Masaru Takayama, Saitama (JP)

(73) Assignee: Enplas Corporation, Saitama (JP)

( * ) Notice: Subject to any disclaimer, the term of this patent is extended or adjusted under 35 U.S.C. 154(b) by 699 days.

(21) Appl. No.: 10/816,122

(22) Filed: Apr. 1, 2004

(65) Prior Publication Data
US 2004/0194566 A1    Oct. 7, 2004

(30) Foreign Application Priority Data
Apr. 4, 2003    (JP)    ............... P2003-101418

(51) Int. Cl.
*F16H 55/17*    (2006.01)
(52) U.S. Cl. ............... 74/431; 74/DIG. 10; 403/318; 403/355
(58) Field of Classification Search ............... 74/431, 74/DIG. 10; 403/355, 318
See application file for complete search history.

(56) References Cited
U.S. PATENT DOCUMENTS
4,171,939 A * 10/1979 Harwath ............... 418/170
4,373,831 A * 2/1983 Crawford ............... 403/318
4,902,162 A * 2/1990 Watt ............... 403/355

FOREIGN PATENT DOCUMENTS
DE    26 11 882    * 9/1977
JP    2001/289311    10/2001

* cited by examiner

*Primary Examiner*—William C. Joyce
(74) *Attorney, Agent, or Firm*—Bachman & LaPointe, P.C.

(57) ABSTRACT

There is provided a resin gear 1 capable of improving the strength of a key receiving portion, which is engageable with a key of a driving shaft, to prevent the key receiving portion from being broken by external force applied during rotation. In the resin gear 1, an outside rim 6 is connected to an inside hub 4 by a web 7 in radial directions. On the side of one end of the hub 4, a key receiving portion 10 for engaging a key of a driving shaft 2 is formed. The key receiving portion 10 has a side wall 1 for preventing relative rotation of the key 8 to the hub 4, and a bottom wall 12 for allowing the key 8 and hub 4 from being positioned in directions parallel to the driving shaft 2. An inside web 7a, which is a portion of the web 7 surrounding the hub 4 and key receiving portion 10, is arranged so that a contact point P at which the wide wall 11 of the key receiving portion 10 contacts the key 8 is substantially arranged on a plane which includes the center of the inside web 7a in thickness directions and which is parallel to the inside web 7a.

4 Claims, 16 Drawing Sheets

RESIN GEAR AND ROTATIONAL POWER TRANSMISSION MEMBER OF RESIN

BACKGROUND OF THE INVENTION

1. Field of the Invention

The present invention relates to a resin gear forming a power transmission device for various machines, such as printers, copying machines, video tape recorders and automotive parts. The present invention also relates to a rotational power transmission member of a resin, such as a resin gear, a resin pulley or a resin sprocket.

2. Description of the Prior Art

Conventional power transmission devices for machines, such as copying machines and automotive parts use resin gears in order to reduce the price, weight and operation noises of parts. Typically, such a resin gear is formed so as to have a predetermined shape by injection molding. The shape of the resin gear is devised so that the resin gear has a desired precision of tooth profile and a desired strength in accordance with intended purpose.

FIGS. 16 through 18 show such a conventional resin gear 30. In the resin gear 30 shown in these figures, a rim 31 is connected to a hub 32 by a web 33. On the side of one end of the hub 34, a key receiving portion 34 is formed. The key receiving portion 34 is designed to receive therein and engage a key 36 of a driving shaft 35 to rotate with the driving shaft 35 (see, e.g., Japanese Patent Laid-Open No. 2001-289311).

In the conventional resin gear 30 shown in FIGS. 16 through 18, the bottom wall 37 of the key receiving portion 34 and the web 37, which has a thickness substantially equal to the thickness of the bottom wall 37, are substantially arranged at the same position in width directions (in right and left directions in FIG. 17). Thus, stress (bending stress and/or shearing stress), which is caused by force applied from the key 36 during power transmission, is applied so as to concentrate on corner portions 40 which are defined by the bottom wall 37 and side walls 38 of the key receiving portion 34, so that there is the possibility that the key receiving portion 34 may be broken. In such a case, if the thickness of the web 33 is increased so that the web 33 receives stress applied on the key receiving portion 34, it is possible to prevent the key receiving portion 34 from being broken. However, in the resin gear 30, it is required to suppress the deterioration of the precision of tooth profile due to shrinkage or the like after injection molding to maintain a desired precision of tooth profile, so that the thickness of the web 33 is limited in order to maintain the precision of tooth profile. As a result, it is difficult to sufficiently ensure the strength of the key receiving portion 34 of the conventional resin gear 30.

SUMMARY OF THE INVENTION

It is therefore an object of the present invention to eliminate the aforementioned problems and to provide a resin gear and a rotational power transmission member of a resin, which have an enhanced strength during power transmission by improving the shape of a portion surrounding a key receiving portion.

In order to accomplish the aforementioned and other objects, according to one aspect of the present invention, a resin gear comprises: a rim having teeth on an outer periphery thereof; a hub for receiving therein a driving shaft, one end portion of the hub having a key receiving portion for engaging a key of the driving shaft; and a web extending in radial directions to connect the rim to the hub, wherein the key receiving portion has a side wall for preventing relative rotation of the key to the hub, and a bottom wall for allowing the key and the hub from being positioned in directions parallel to the driving shaft, and a portion of the web surrounding the hub and key receiving portion is arranged so as to be shifted from the bottom wall of the key receiving portion toward a contact portion in which the key contacts the side wall of the key receiving portion.

In the resin gear, the contact portion may be arranged between a plane, which includes one surface of the portion of the web, and a plane which includes the other surface of the portion of the web. The contact portion may be substantially arranged on a plane which includes the center of the portion of the web in thickness directions and which is parallel to the portion of the web.

According to another aspect of the present invention, a resin gear comprises: a rim having teeth on an outer periphery thereof; a hub for receiving therein a driving shaft, one end portion of the hub having a key receiving portion for engaging a key of the driving shaft; and a web extending in radial directions to connect the rim to the hub, wherein the key receiving portion has a side wall for preventing relative rotation of the key to the hub, and a contact portion, in which the key contacts the side wall of the key receiving portion, is arranged between a plane, which includes one surface of a portion of the web surrounding the hub and key receiving portion, and a plane which includes the other surface of the portion of the web.

According to a further aspect of the present invention, a rotational power transmission member of a resin comprises: an outside cylindrical portion; an inside cylindrical portion which has an axial hole for receiving therein a driving shaft and which is arranged in the outside cylindrical portion, one end portion of the inside cylindrical portion having a key receiving portion for engaging a key of the driving shaft; and a thin plate portion which extends in radial directions to connect the outside cylindrical portion to the inside cylindrical portion, wherein the key receiving portion has a side wall for preventing relative rotation of the key to the inside cylindrical portion, and a bottom wall for allowing the key and the inside cylindrical portion from being positioned in directions parallel to the driving shaft, and a portion of the thin plate portion surrounding the inside cylindrical portion and key receiving portion is arranged so as to be shifted from the bottom wall of the key receiving portion toward a contact portion in which the key contacts the side wall of the key receiving portion.

In the rotational power transmission member, the contact portion may be arranged between a plane, which includes one surface of the portion of the thin plate portion, and a plane which includes the other surface of the portion of the thin plate portion. The contact portion may be substantially arranged on a plane which includes the center of the portion of the thin plate portion in thickness directions and which is parallel to the portion of the thin plate portion.

According to a still further aspect of the present invention, a rotational power transmission member of a resin comprises: an outside cylindrical portion; an inside cylindrical portion which has an axial hole for receiving therein a driving shaft and which is arranged in the outside cylindrical portion, one end portion of the inside cylindrical portion having a key receiving portion for engaging a key of the driving shaft; and a thin plate portion which extends in radial directions to connect the outside cylindrical portion to the inside cylindrical portion, wherein the key receiving portion has a side wall for preventing relative rotation of the key to the inside cylindrical portion, and a contact portion, in which the key contacts the side wall of the key receiving portion, is arranged between a plane, which includes one surface of a portion of the thin plate portion surrounding the inside cylindrical portion and key receiving portion, and a plane which includes the other surface of the portion of the thin plate portion.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below in detail.

First Preferred Embodiment

Figure 1:
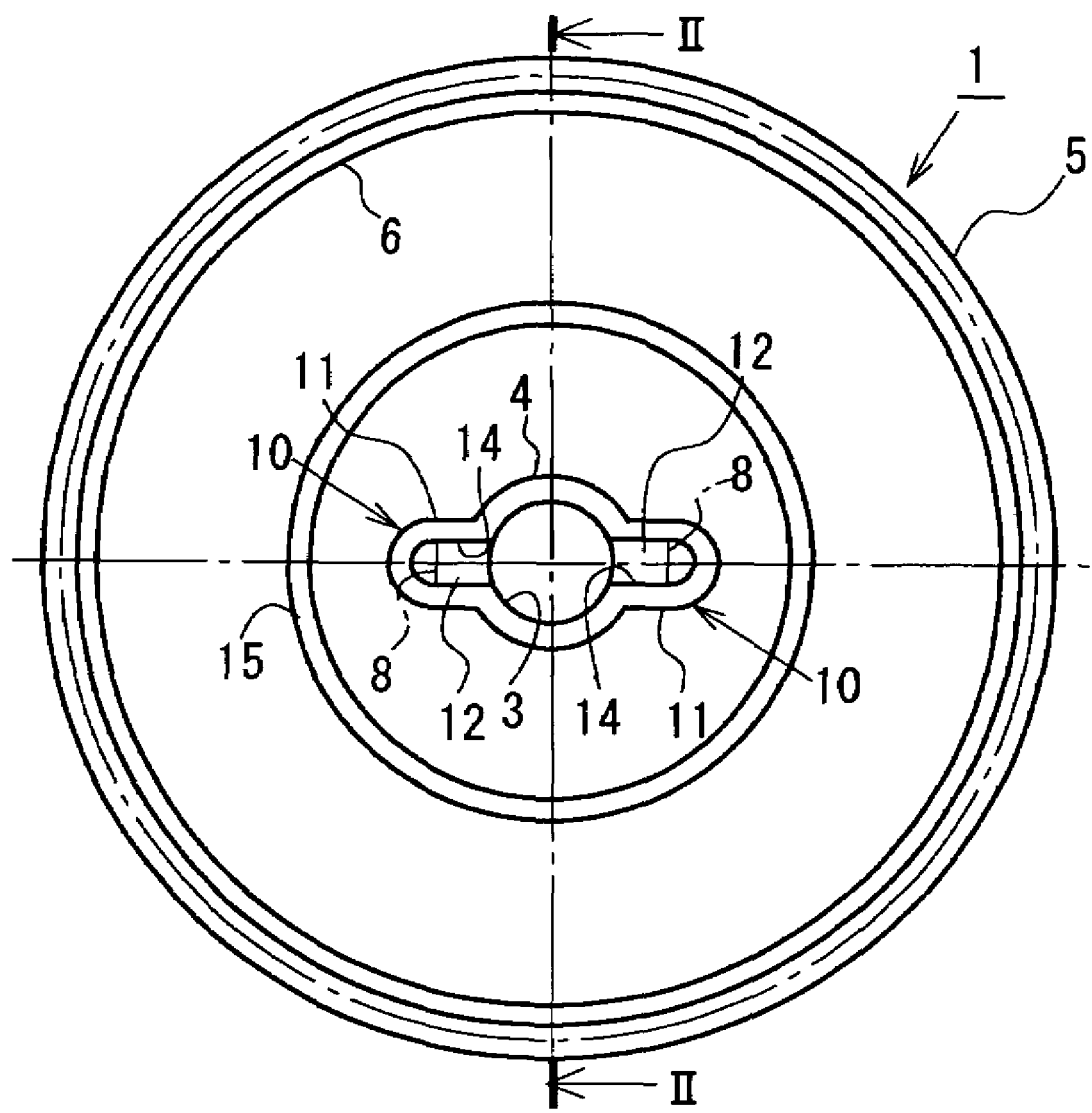
FIG. 1 is a front view of the first preferred embodiment of a resin gear according to the present invention.
Figure 2:
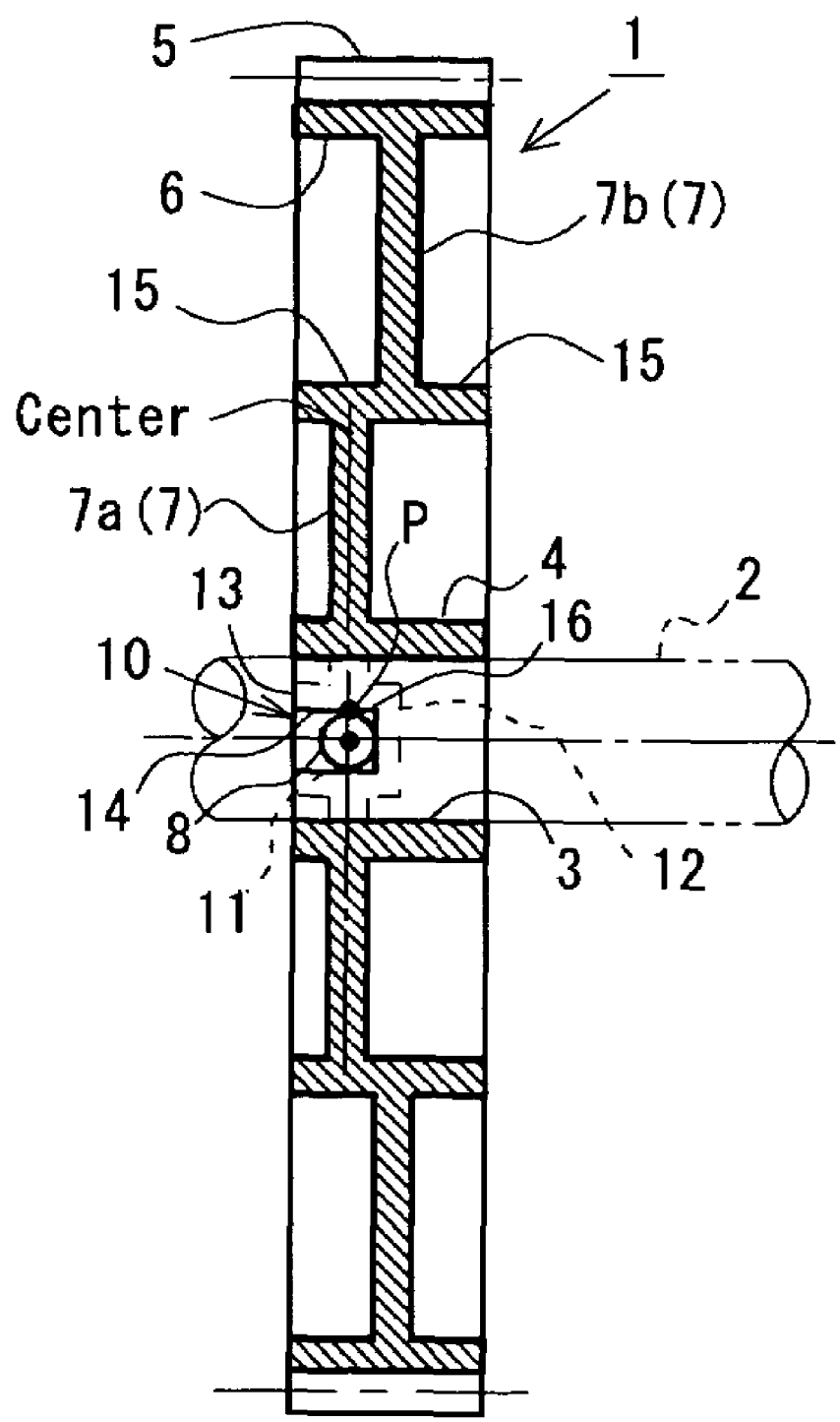
FIG. 2 is a sectional view of the resin gear taken along line II-II of FIG. 1.
Figure 3:
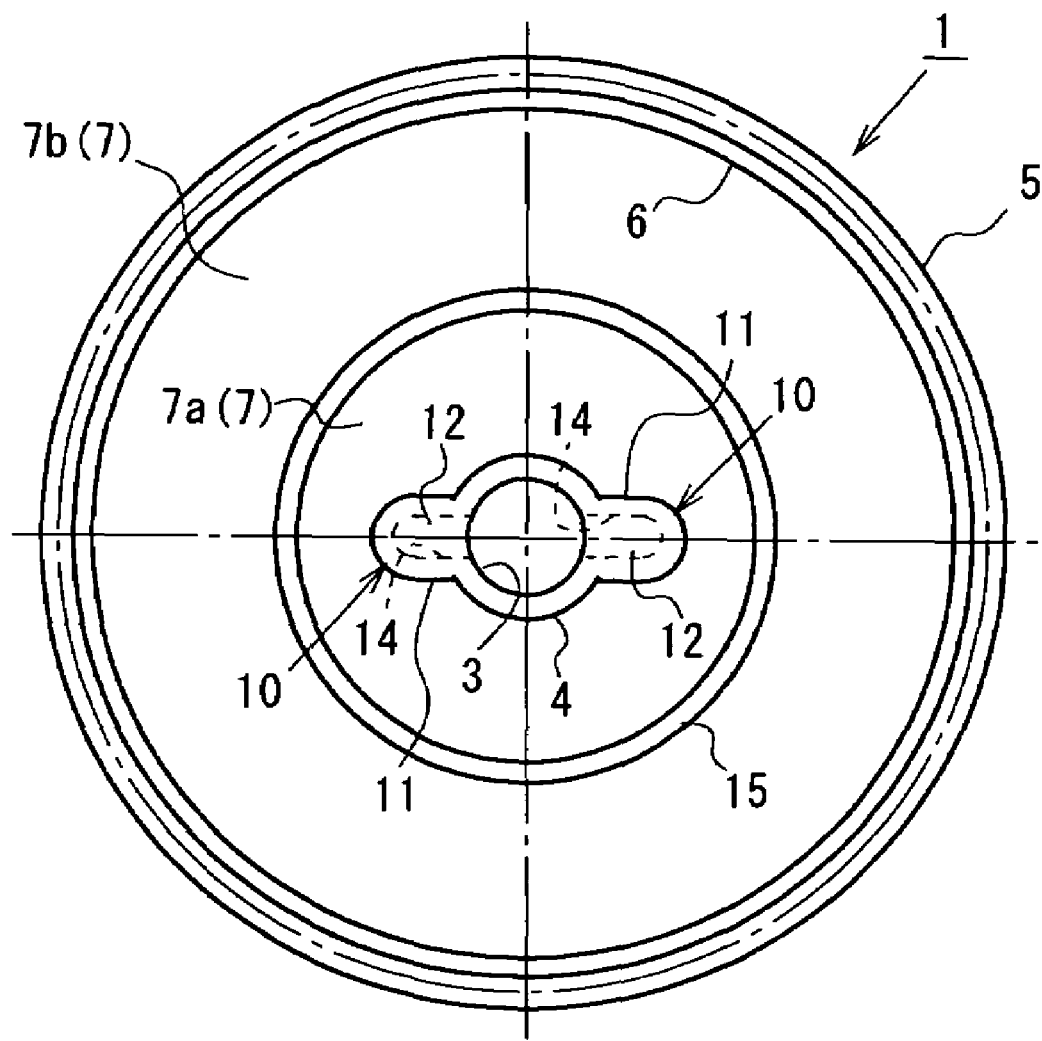
FIG. 3 is a back view of the resin gear of FIG. 1.

FIGS. 1 through 3 show the first preferred embodiment of a resin gear (a rotational power transmission member of a resin) 1. FIG. 1 is a front view of the resin gear 1, and FIG. 2 is a sectional view of the resin gear 1 taken along line II-II of FIG. 1. FIG. 3 is a back view of the resin gear 1.

As shown in these figures, the resin gear 1 is formed by injection-molding a resin material, such as polyacetal or fluoridated carbonate, and comprises: a substantially cylindrical hub (inside cylindrical portion) 4 having an axial hole 3 capable of receiving therein and engaging a driving shaft 2; a substantially cylindrical rim (outside cylindrical portion) 6 having teeth 5 on the outer periphery thereof; and webs (thin plate portions) 7 (7a, 7b) connecting the hub 4, which is arranged inwardly in radial directions, to the rim 6 which is arranged outwardly in radial directions.

On the side of one end of the hub 4, there is formed a key receiving portion 10 for receiving therein and engaging a round-bar-shaped key 8 which protrudes from the outer periphery of the driving shaft 2. The key receiving portion 10 has a side wall 11 protruding from the outer periphery of the hub 4 so as to serve as a detent for the key 8, a bottom wall 12 serving as a positioning means which is designed to contact the key 8, and a key way 14 having a groove depth from an end face 13 to the bottom wall 12 on the side of the one end of the hub 4. The key way 14 of the key receiving portion 10 is capable of receiving therein the key 8 of the driving shaft 2 by sliding the resin gear 1 along the driving shaft 2 when the driving shaft 2 is fitted into the axial hole 3 of the resin gear 1. The side wall 11 has a substantially circular shape on the side of the outer periphery in radial directions so as not to prevent the flowability of a resin when the resin gear 1 is formed by injection molding. The key 8 should not be limited to the round-bar-shaped pin. For example, the key 8 may be a square-bar-shaped pin. The shape of the key 8 may be any shape if the key 8 is engageable with the key way 14 of the key receiving portion 10 and if power can be transmitted.

A portion (which will be herein after referred to as an inside web 7a) of the web 7 surrounding the hub 4 and key receiving portion 10 is formed so that the center line thereof in thickness directions in FIG. 2 is substantially coincident with a contact point P, at which the side wall 11 of the key receiving portion 10 contacts the key 8 in FIG. 2. As a result, the inside web 7a is arranged so as to be shifted from the bottom wall 12 of the key receiving portion 10 toward the one end of the hub 4 (on the left side in FIG. 2). If the web 7 is too thick, the amount of shrinkage increases during cooling after injection molding, so that the precision of the resin gear 1 deteriorates. Therefore, the thickness of the web 7 is determined so as to be a predetermined thickness in accordance with the outside diameter of the resin gear 1 and so forth.

On the outer periphery of the inside web 7a, there is formed a circumferential rib 15 which is substantially concentric with the hub 4. On the outer periphery of the circumferential rib 15, there is formed an outside web 7b which extends in radial directions to connect the circumferential rib 15 to the rim 6. The outside web 7b is arranged substantially at the center of the rim 6 in width directions, and has a thickness which is substantially equal to the thickness of the inside web 7a. While the outside web 7b has been arranged substantially at the center of the rim 6 in width directions in this preferred embodiment, the present invention should not be limited thereto. For example, the outside web 7b may be formed so as to extend from the inside web 7a outwardly in radial directions, or may be formed on one end portion of the rim 6 in width directions.

According to this preferred embodiment with such a construction, since the contact portion of the key 8 of the driving shaft 2 with the side wall 11 of the key receiving portion 10 can be supported on the inside web 7a, it is possible to reduce stress (bending stress and/or shearing stress) which is applied on the corner portions 16 defined by the side wall 11 and bottom wall 12 of the key receiving portion 10, so that it is possible to improve the strength of the key receiving portion 10. As a result, according to the resin gear 1 in this preferred embodiment, it is possible to prevent the key receiving portion from being broken, and it is possible to surely transmit rotational power.

Second Preferred Embodiment

Figure 4:
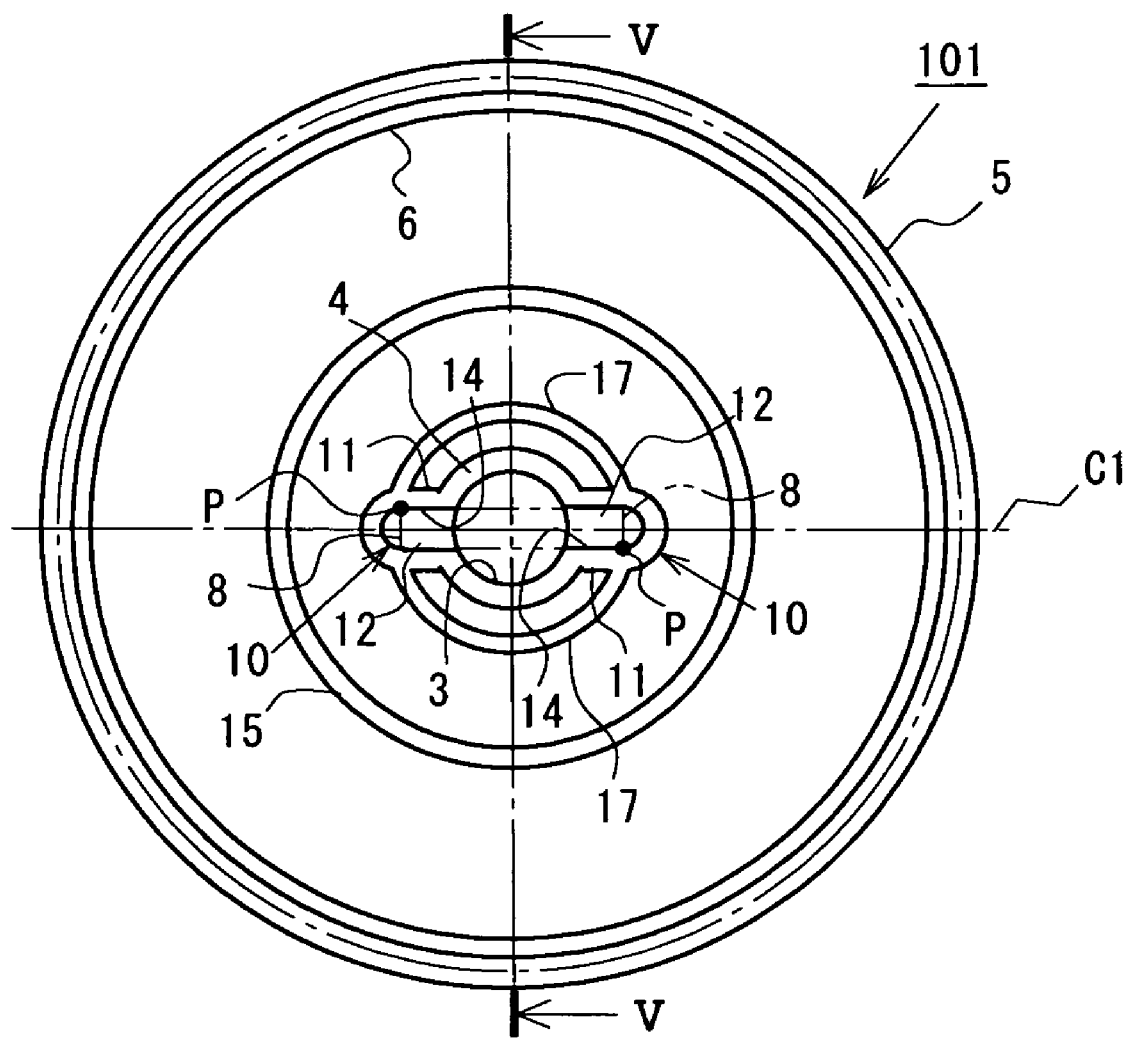
FIG. 4 is a front view of the second preferred embodiment of a resin gear according to the present invention.
Figure 5:
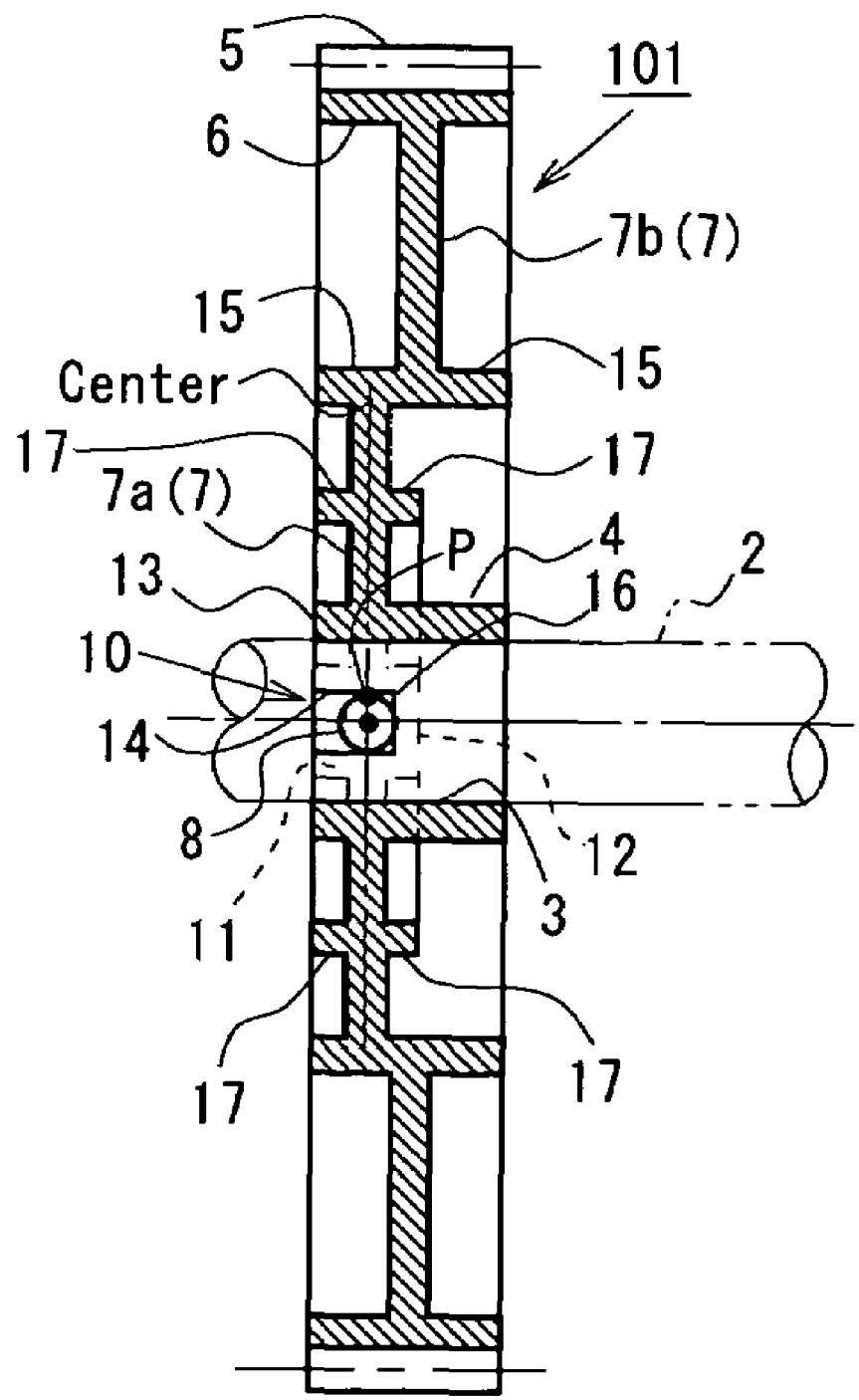
FIG. 5 is a sectional view of the resin gear taken along line V-V of FIG. 4.
Figure 6:
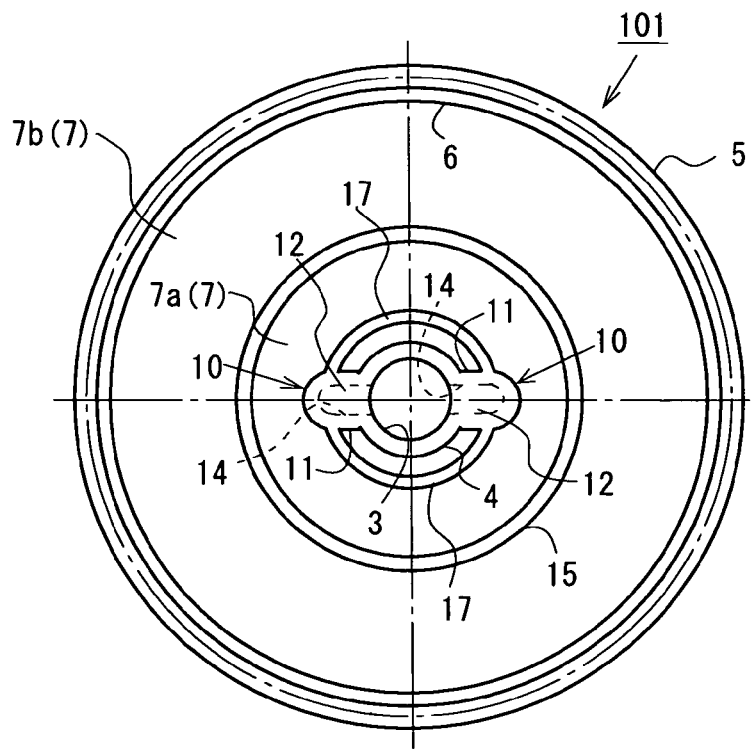
FIG. 6 is a back view of the resin gear of FIG. 4.
Figure 7:
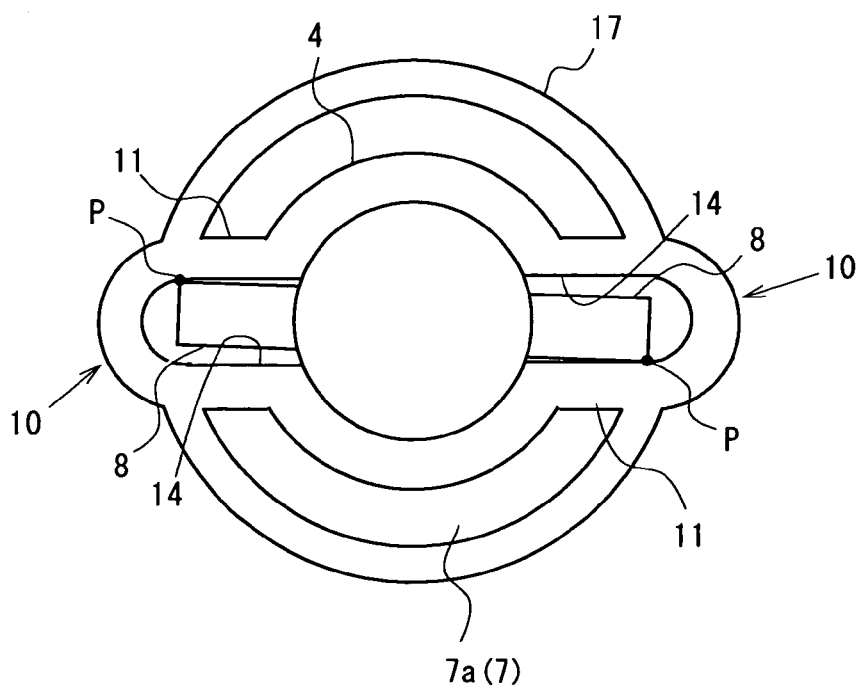
FIG. 7 is an enlarged view of a part of the resin gear of FIG. 4, which shows the engagement of a key receiving portion with a key.

FIGS. 4 through 7 show the second preferred embodiment of a resin gear 101 according to the present invention. FIG. 4 is a front view of the resin gear 101, and FIG. 5 is a sectional view of the resin gear 101 taken along line V-V of FIG. 4. FIG. 6 is a back view of the resin gear 101. FIG. 7 is an enlarged view of a part of the resin gear 101, which shows the engagement of a key receiving portion 10 with a key 8. In this preferred embodiment, the same reference numbers as those in the above described first preferred embodiment are given to the same or similar portions as or to those in the first preferred embodiment to omit repeated explanation.

As shown in these figures, a pair of reinforcing circumferential ribs 17 which are substantially concentric with a hub 4 are formed on the side of the outer periphery of the hub 4. Each end portion of the pair of reinforcing circumferential ribs 17 is connected to a corresponding one of portions (portions corresponding to contact points P) of a side wall 11 of the key receiving portion 10, which contact end portions of the key 8. The pair of reinforcing circumferential ribs 17 are symmetrical with respect to a center line C1. Each of the pair of reinforcing circumferential ribs 17 is arranged on both sides of an inside web 7a.

If the resin gear 101 with such a construction is driven by the key 8 of the driving shaft 2, the key 8 is slightly inclined in a key way 14 due to a gap between the key 8 and the key way 14, so that the end of the key 8 contacts the side wall 11 of the key receiving portion 10 to apply large driving force on the contact point P between the end of the key 8 and the side wall 11 of the key receiving portion 10 (see FIG. 7). Therefore, if the point (contact point P) of the end of the key 8 contacting the side wall 11 of the key receiving portion 10 is supported on the reinforcing circumferential rib 17, it is possible to improve the strength of the key receiving portion 10.

Thus, according to the resin gear 101 in this preferred embodiment, it is possible to further improve the strength of the key receiving portion 10 due to synergistic effects of the above described advantageous effects in the first preferred embodiment and the above described reinforcing effect of the reinforcing circumferential rib 17.

Third Preferred Embodiment

Figure 8:
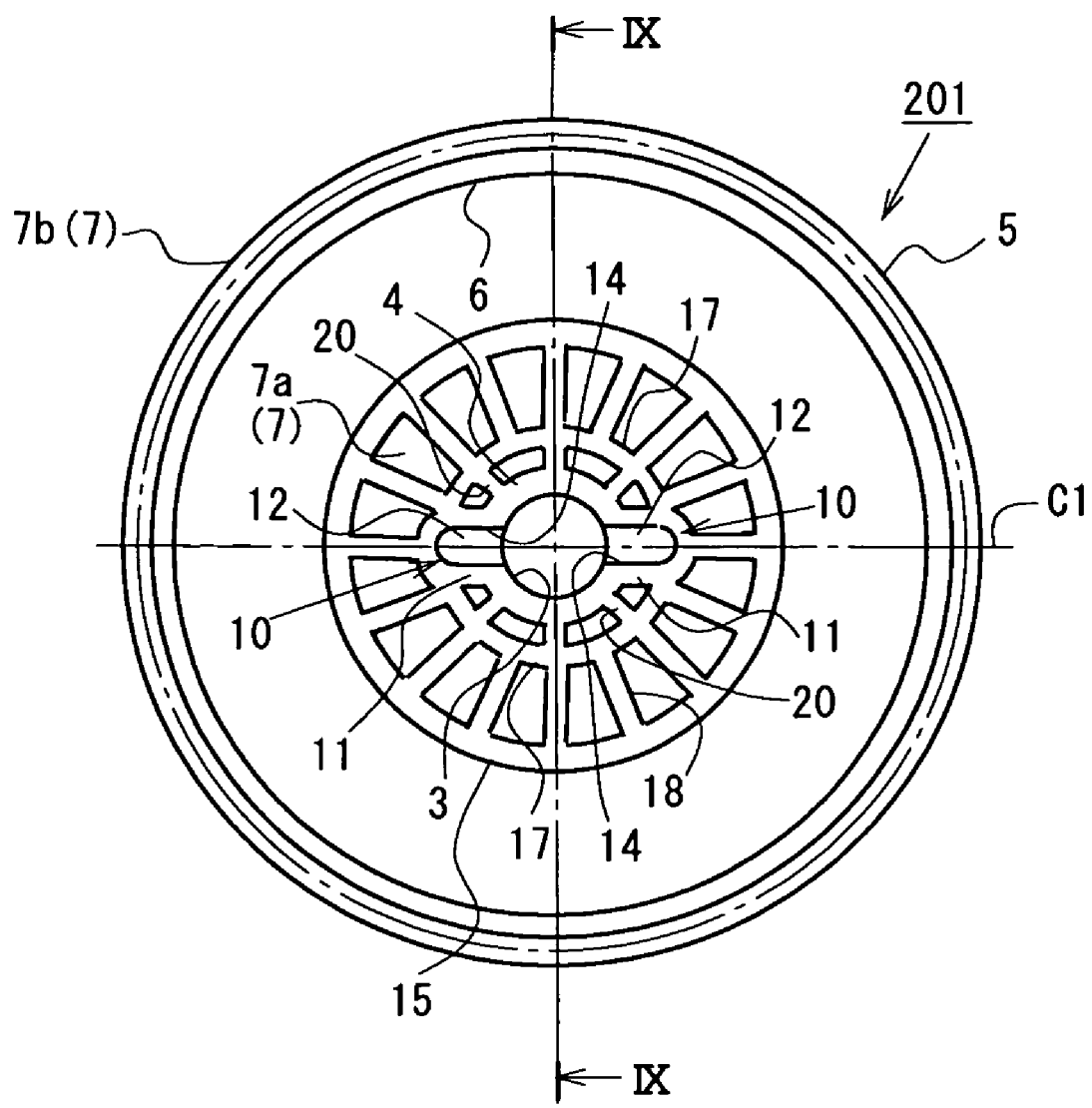
FIG. 8 is a front view of the third preferred embodiment of a resin gear according to the present invention.
Figure 9:
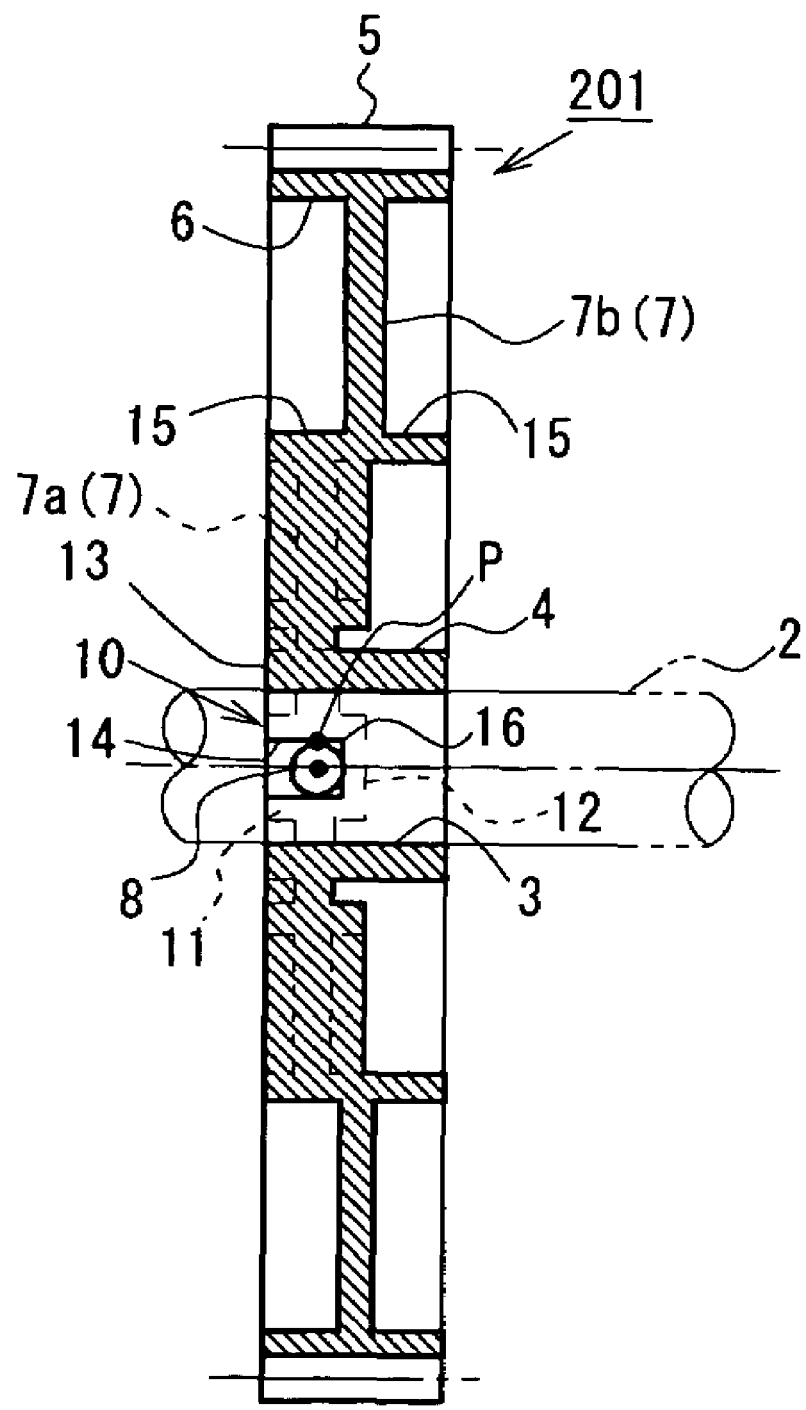
FIG. 9 is a sectional view of the resin gear taken along line IX-IX of FIG. 8.
Figure 10:
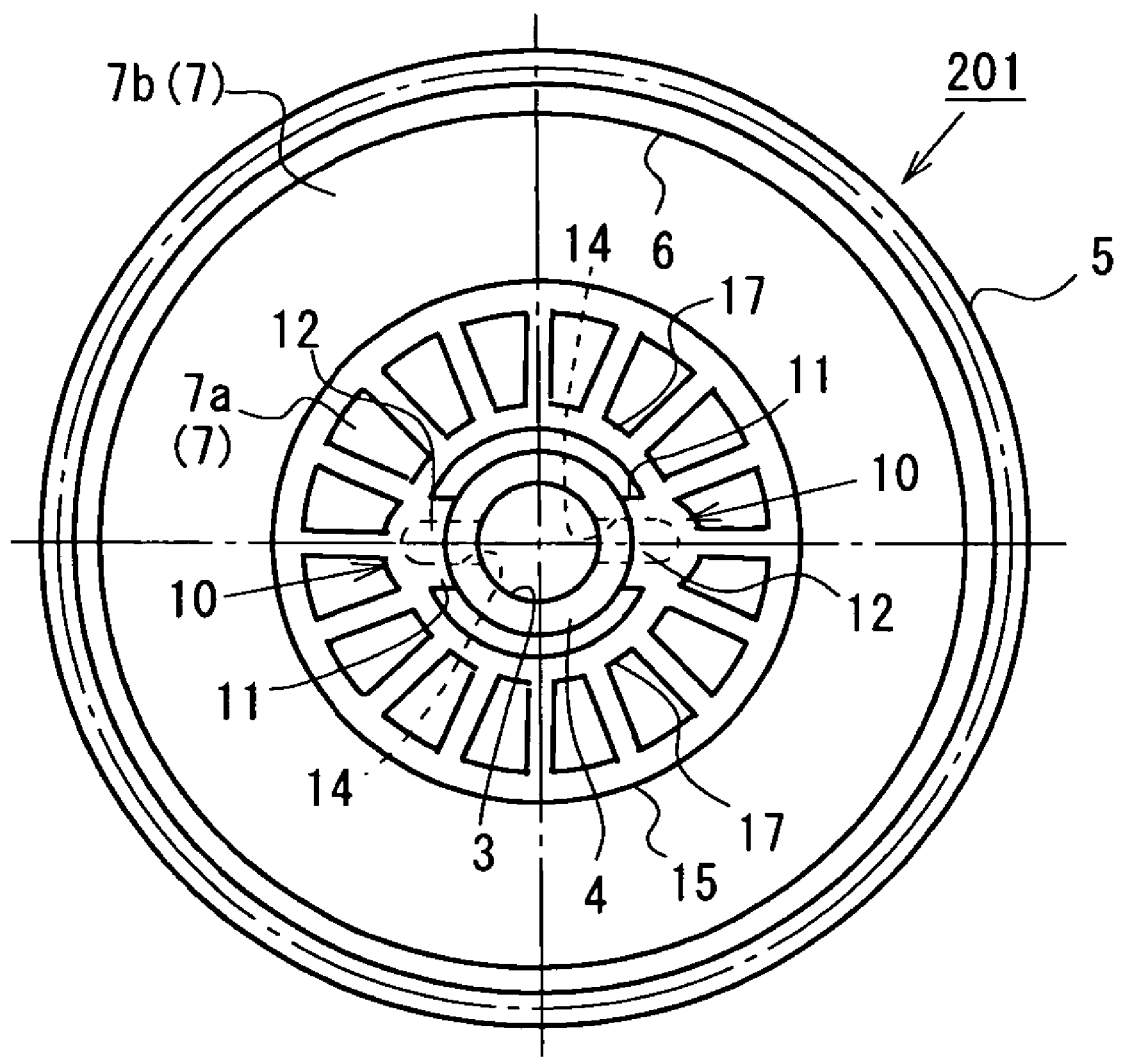
FIG. 10 is a back view of the resin gear of FIG. 8.

FIGS. 8 through 10 show the third preferred embodiment of a resin gear 201 according to the present invention. FIG. 8 is a front view of the resin gear 201, and FIG. 9 is a sectional view of the resin gear 201 taken along line IX-IX of FIG. 8. FIG. 10 is a back view of the resin gear 201. In this preferred embodiment, the same reference numbers as those in the above described first and second preferred embodiments are given to the same or similar portions as or to those in the first and second preferred embodiments to omit repeated explanation.

As shown in these figures, in the resin gear 201 in this preferred embodiment, a pair of reinforcing circumferential ribs 17 are connected to a circumferential rib 15 by means of a plurality of outside radial ribs 18, and the pair of reinforcing circumferential ribs 17 are connected to a hub 4 by means of a plurality of inside radial ribs 20. The outside radial ribs 18 and the inside radial ribs 20 are formed so as to extend in substantially radial directions with respect to the center of the hub 4. The number of the inside radial ribs 20 is smaller than the number of the outside radial ribs 18 in view of the amount of shrinkage during cooling after injection molding. Each of the outside radial ribs 18 is formed on both sides of the inside web 7a. Each of the inside radial ribs 20 is formed only on the front side (on the left side in FIG. 9) of the inside web 7a.

Thus, according to this preferred embodiment with such a construction, the inside web 7a and the reinforcing circumferential ribs 17 are effectively reinforced by the inside radial ribs 20 and outside radial ribs 18, so that it is possible to further improve the strength of the key receiving portion 10 due to synergistic effects of advantageous effects in this preferred embodiment and in the above described first and second preferred embodiments.

Fourth Preferred Embodiment

Figure 11:
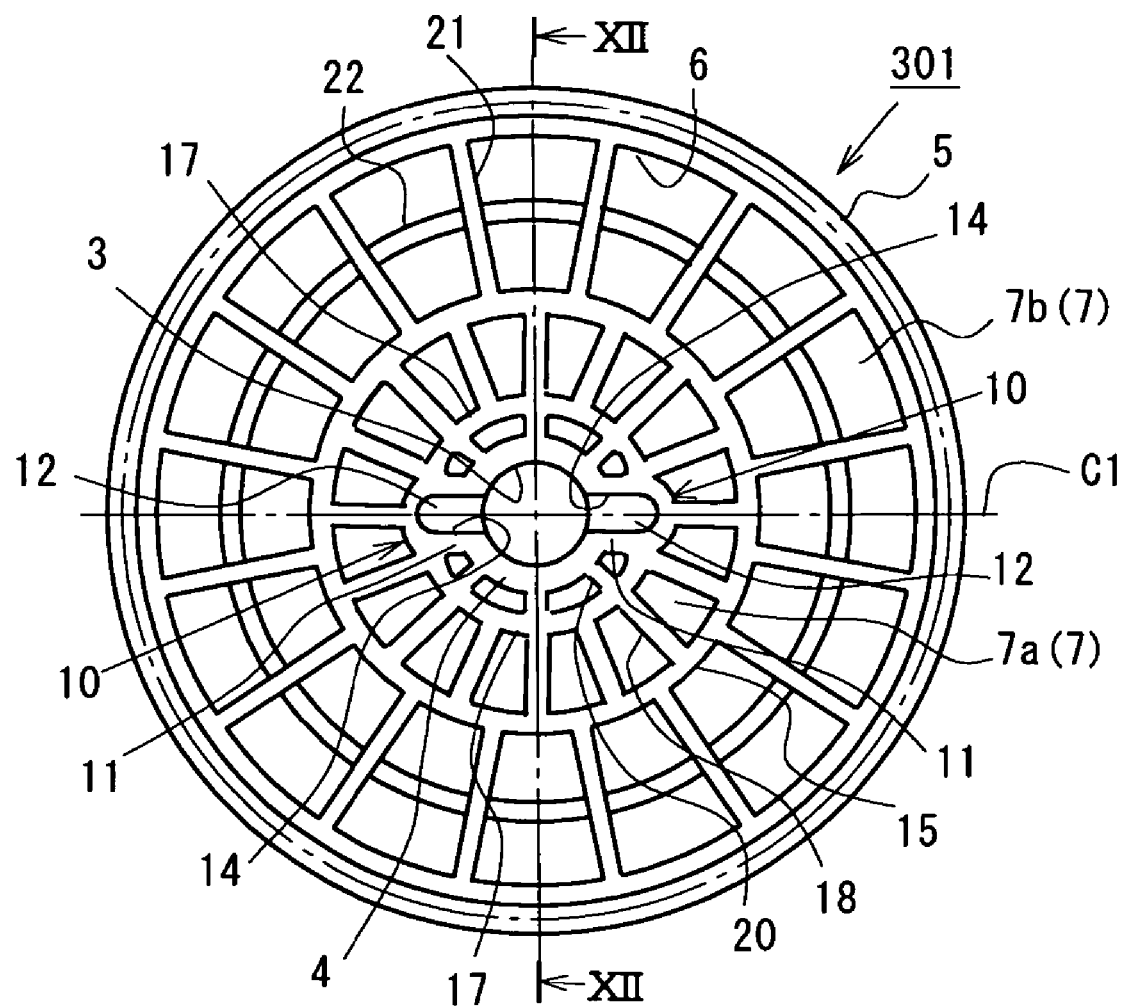
FIG. 11 is a front view of the fourth preferred embodiment of a resin gear according to the present invention.
Figure 12:
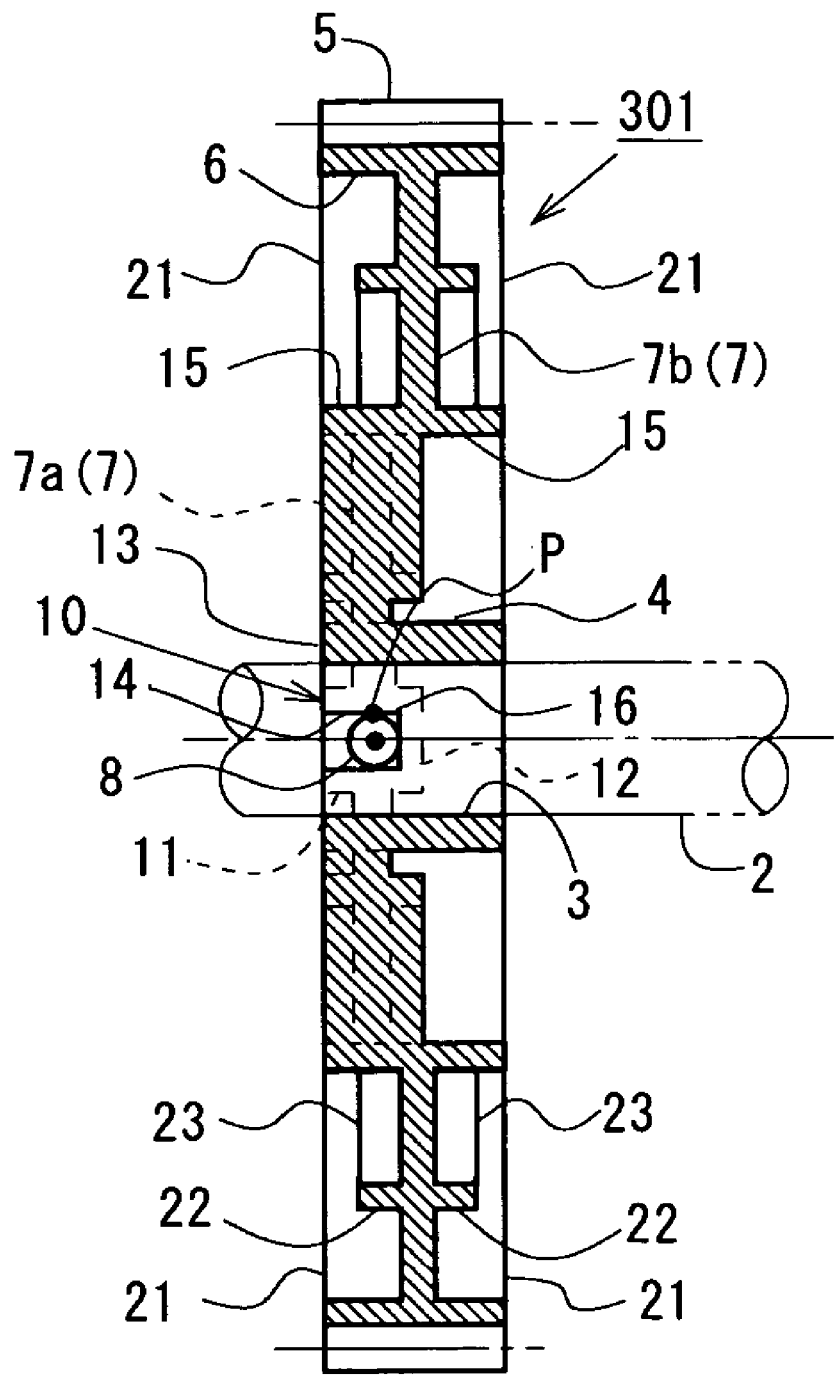
FIG. 12 is a sectional view of the resin gear taken along line XII-XII of FIG. 11.
Figure 13:
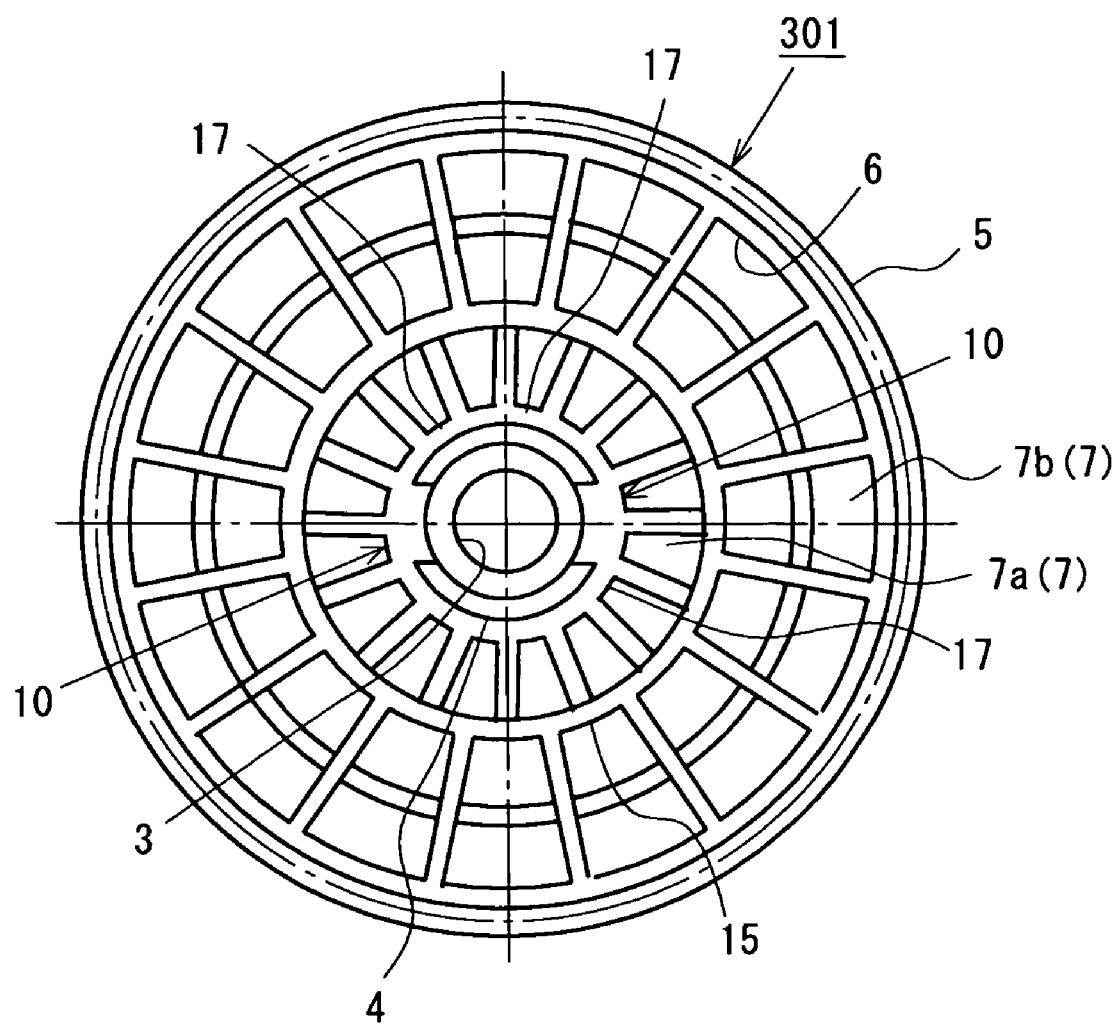
FIG. 13 is a back view of the resin gear of FIG. 11.

FIGS. 11 through 13 show the fourth preferred embodiment of a resin gear 301 according to the present invention. FIG. 11 is a front view of the resin gear 301, and FIG. 12 is a sectional view of the resin gear 301 taken along line XII-XII of FIG. 11. FIG. 13 is a back view of the resin gear 301. In this preferred embodiment, the same reference numbers as those in the above described first through third preferred embodiments are given to the same or similar portions as or to those in the first through third preferred embodiments to omit repeated explanation.

As shown in these figures, in the resin gear 301 in this preferred embodiment, a plurality of radial ribs 21, which extend in radial directions to connect a circumferential rib 15 to a rim 6, are formed on both sides of an outside web 7b between the circumferential rib 15 and the rim 6. In addition, an outside circumferential rib 22, which is concentric with the circumferential rib 15, is formed on both sides of the outside web 7b between the circumferential rib 15 and the rim 6. In addition, an outside circumferential rib 22, which is concentric with the circumferential rib 15, is formed on both sides of the outside web 7b between the circumferential rib 15 and the rim 6. Furthermore, end faces 23 of the outside circumferential ribs 22 are arranged inside of both sides of the resin gear 301 (toward the outside web 7b).

Thus, according to this preferred embodiment with such a construction, it is possible to improve the strength of a key receiving portion 10 of the resin gear 301 as well as the strength of the whole resin gear 301, and it is possible to improve the precision of transmission of rotation.

Other Preferred Embodiments

Figure 14:
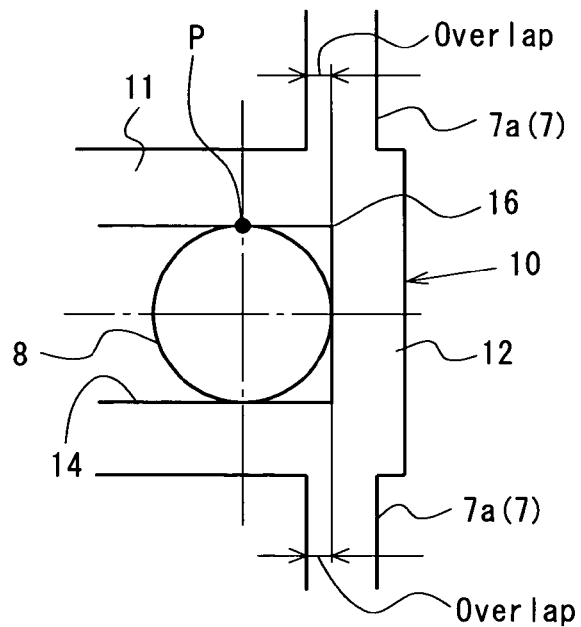
FIG. 14 is an enlarged view of a first example of a key receiving portion in a preferred embodiment of a resin gear according to the present invention.

While the center line of the inside web 7a in thickness directions in the figure has been substantially coincident with the contact point P of the key receiving portion 10 with the key 8 in the figure in the above described first through third preferred embodiments, the present invention should not be limited thereto. As shown in FIG. 14, the inside web 7a may be formed so as to be shifted from the bottom wall 12 of the key receiving portion 10 toward one end of the hub 4 (on the left side in the figure) to support thereon a portion near the contact point P of the side wall 11 of the key receiving portion 10 with the key 8. Thus, the inside web 7a overlaps with the corner portion 16 defined by the bottom wall 12 and side wall 11 of the key receiving portion 10, so that it is possible to reinforce the corner portion 16 which is defined by the bottom wall 12 and side wall 11 and which is easily broken.

Figure 15:
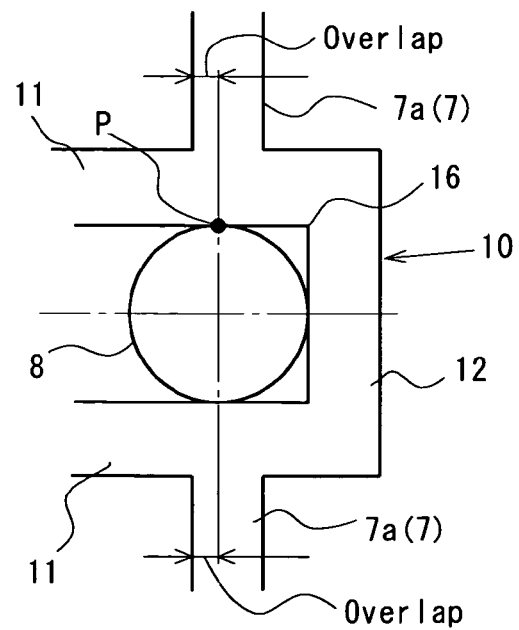
FIG. 15 is an enlarged view of a second example of a key receiving portion in a preferred embodiment of a resin gear according to the present invention.
Figure 16:
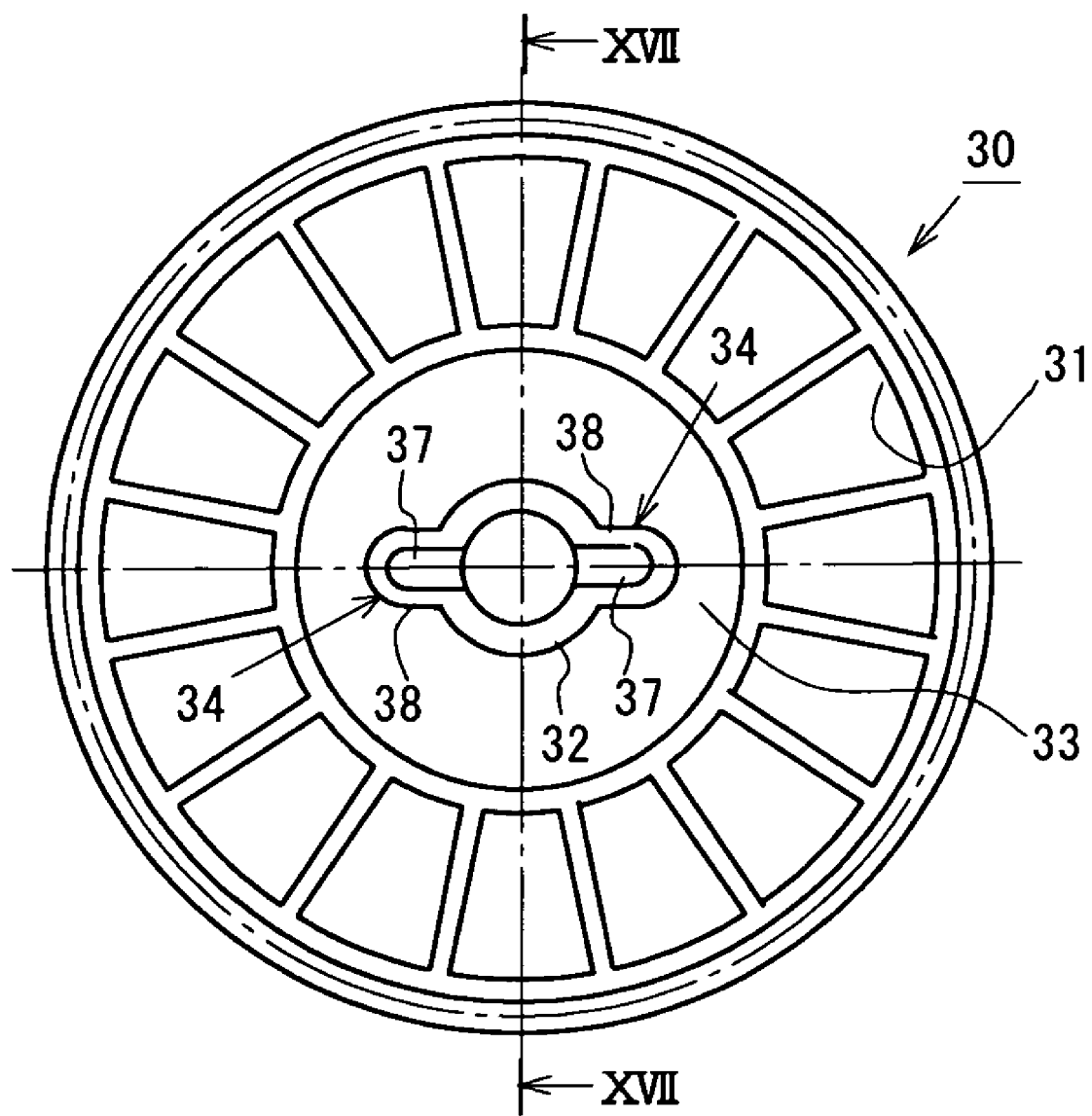
FIG. 16 is a front view of a conventional resin gear.
Figure 17:
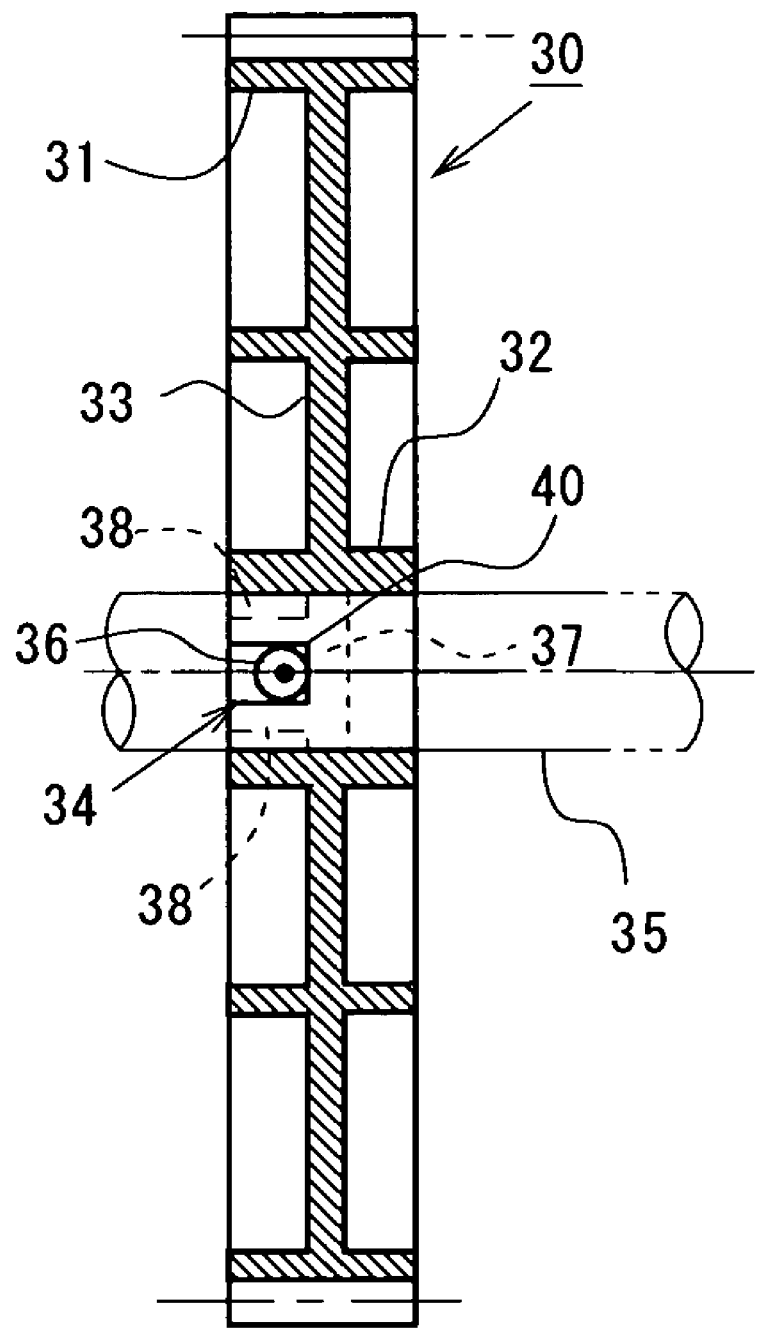
FIG. 17 is a sectional view of the resin gear taken along line XVII-XVII of FIG. 16.
Figure 18:
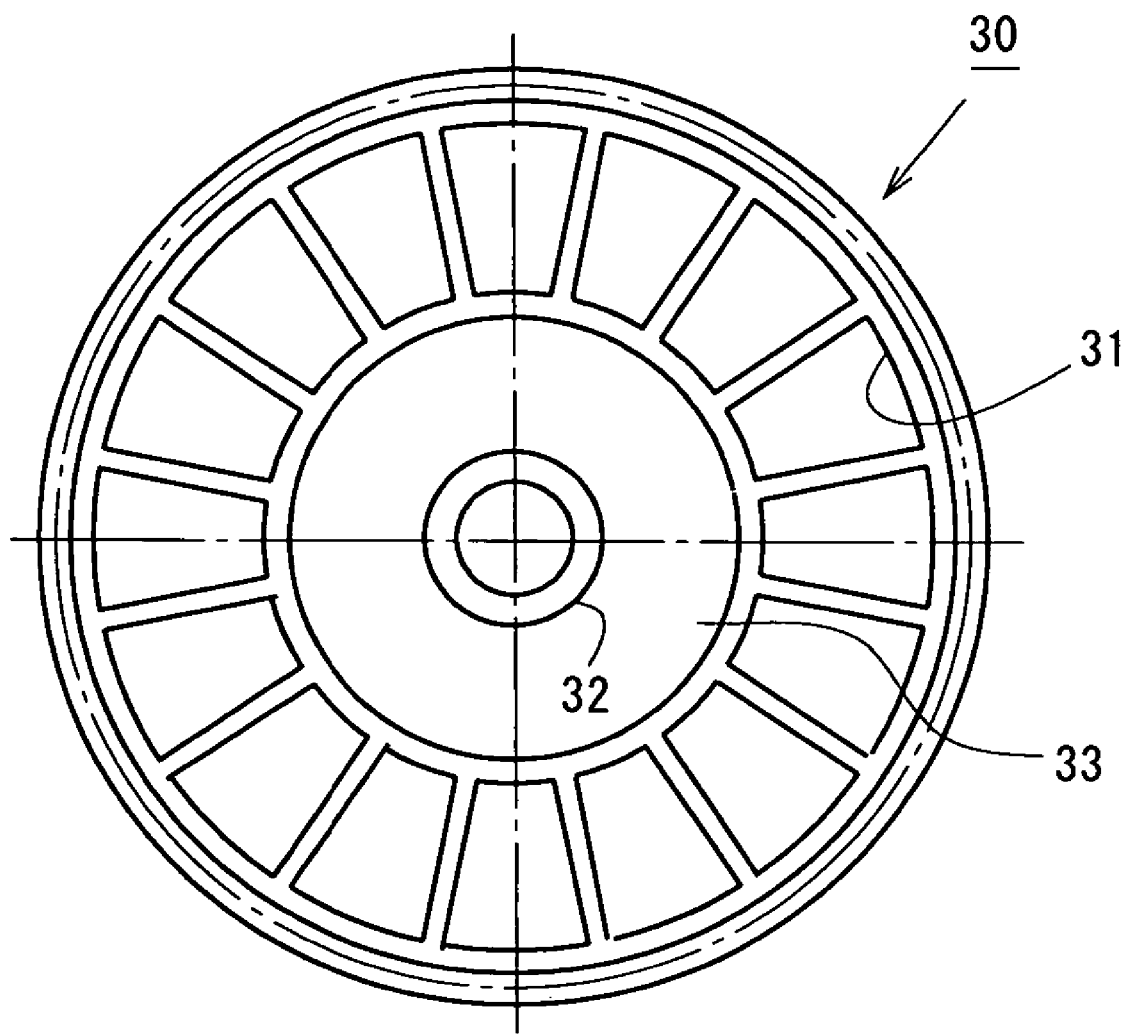
FIG. 18 is a back view of the resin gear of FIG. 16.

Alternatively, as shown in FIG. 15, the inside web 7a may be formed so as to support thereon the contact point P at which the side wall 11 of the key receiving portion 10 contacts the key 8. In this embodiment shown in FIG. 15, the center line of the inside web 7a in thickness directions in the figure is slightly shifted from the contact point P of the side wall 11 of the key receiving portion 10 with the key 8 in the figure, but the contact point P of the side wall 11 with the key 8 is arranged within a range defined by both sides of the inside web 7a in thickness directions. Also in this embodiment similar to the first preferred embodiment, it is possible to reduce stress (bending stress and/or shearing stress), which is applied on the corner portions defined by the wide wall 11 and bottom wall 12, and it is possible to reinforce the key receiving portion 10 by the inside web 7a. In addition to the first preferred embodiment and the embodiments shown in FIGS. 14 and 15, the key receiving portion 10 can be reinforced if the inside web 7a can support thereon a portion near the contact point P of the side wall 11 of the key receiving portion 10 with the key 8.

According to the present invention, the construction of the key receiving portion 10 should not be limited to that in the above described preferred embodiments. If an additional means for positioning the key 8 and hub 4 in directions parallel to the driving shaft 2 is provided, the bottom wall 12 must not be always formed so as to butt against the key 8. Alternatively, according to the present invention, the bottom wall 12 of the key receiving portion 10 may be omitted so that the key way 14 passes through the resin gear 1 from the front side to the back side. In this case, the inside web 7a is preferably formed so as to support thereon the contact point P of the side wall 11 with the key 8 or a portion near the contact point P. Thus, the inside web 7a can also receive external force applied on the side wall 11 during transmission of rotational power, so that it is possible to prevent the wide wall 11 from being broken by the external force.

The present invention can be widely applied to a rotational power transmission member of a resin, such as a pulley, sprocket or roller of a resin, in addition to the resin gear 1 (101, 201) in the first through third preferred embodiments. That is, the present invention can be widely applied to a rotational power transmission member of a resin, which comprises: an outside cylindrical portion, onto which a belt or chain is wound; an inside cylindrical portion having an axial hole; and a thin plate connecting the outside cylindrical portion to the inside cylindrical portion in radial directions. The present invention can also be applied to a roller of a resin, wherein an outside cylindrical portion for contacting an object to be conveyed is connected to an inside cylindrical portion having an axial hole by a thin plate portion and which is used for conveying the object.

According to the present invention, the web is designed to support thereon the contact point, at which external force is applied during transmission of rotational power and at which the key contacts the key receiving portion, or a portion near the contact point. Therefore, it is possible to improve the strength of the key receiving portion, and it is possible to prevent the key receiving portion from being broken, so that it is possible to surely transmit rotational power.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A resin gear comprising:
a rim having teeth on an outer periphery thereof;
a hub for receiving therein a driving shaft, one end portion of the hub having a key receiving portion for engaging a key of the driving shaft;
a rib arranged between said rim and said hub; and
a web having an outside web portion and an inside web portion, said outside web portion extending in radial directions to connect said rim to said rib, and said inside web portion extending in radial directions to connect said rib to said hub,
wherein said key receiving portion has a side wall for preventing relative rotation of the key to the hub, and a bottom wall for allowing the key and the hub from being positioned in directions parallel to the driving shaft, and
said inside web portion of said web is arranged so as to be shifted from the bottom wall of the key receiving portion toward a contact portion in which the key contacts the side wall of the key receiving portion, said inside web portion being arranged so as to be shifted from said outside web portion in one of said directions parallel to the driving shaft.

2. A resin gear as set forth in claim 1, wherein said contact portion is arranged between a plane, which includes one surface of said inside web portion of said web, and a plane which includes the other surface of said inside web portion of said web.

3. A resin gear as set forth in claim 1, wherein said contact portion is substantially arranged on a plane which includes the center of said inside web portion of said web in thickness directions and which is parallel to said inside web portion of said web.

4. A resin gear comprising:
a rim having teeth on an outer periphery thereof;
a hub for receiving therein a driving shaft, one end portion of the hub having a key receiving portion for engaging a key of the driving shaft;
a rib arranged between said rim and said hub; and
a web having an outside web portion and an inside web portion, said outside web portion extending in radial directions to connect said rim to said rib, and said inside web portion extending in radial directions to connect said rib to said hub,
wherein said key receiving portion has a side wall for preventing relative rotation of the key to the hub, and a contact portion, in which the key contacts the side wall of the key receiving portion, is arranged between a plane, which includes one surface of said inside web portion of said web, and a plane which includes the other surface of said inside web portion of said web, said inside web portion being arranged so as to be shifted from said outside web portion in one of said directions parallel to the driving shaft.

* * * * *